United States Patent
King

(10) Patent No.: US 11,708,845 B2
(45) Date of Patent: *Jul. 25, 2023

(54) POWER UNITS WITH MANUAL OVERRIDE CONTROLS FOR HYDRAULIC SYSTEMS

(71) Applicant: KTI Hydraulics Inc., Santa Ana, CA (US)

(72) Inventor: John King, Santa Ana, CA (US)

(73) Assignee: KTI Hydraulics Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,747

(22) Filed: Oct. 5, 2022

(65) Prior Publication Data

US 2023/0035122 A1 Feb. 2, 2023

Related U.S. Application Data

(63) Continuation of application No. 17/476,063, filed on Sep. 15, 2021, now Pat. No. 11,486,419, which is a continuation of application No. 16/984,958, filed on Aug. 4, 2020, now Pat. No. 11,149,765, which is a continuation of application No. 16/458,914, filed on Jul. 1, 2019, now Pat. No. 10,760,599.

(Continued)

(51) Int. Cl.
*F15B 20/00* (2006.01)
*F15B 11/00* (2006.01)
*B60P 1/16* (2006.01)

(52) U.S. Cl.
CPC ............ *F15B 20/002* (2013.01); *B60P 1/162* (2013.01); *F15B 11/003* (2013.01); *F15B 2211/20515* (2013.01); *F15B 2211/30505* (2013.01); *F15B 2211/30515* (2013.01); *F15B 2211/895* (2013.01)

(58) Field of Classification Search
CPC ...... F15B 11/003; F15B 11/024; F15B 13/01; F15B 13/015; F15B 20/002; F15B 2211/30515; F15B 2211/895
See application file for complete search history.

(56) References Cited

U.S. PATENT DOCUMENTS 6,095,187 A * 8/2000 Hotchkiss ............... F15B 13/01
137/596.2
7,434,395 B2 * 10/2008 He ........................ F15B 15/1428
60/475

(Continued)

*Primary Examiner* — Michael Leslie
(74) *Attorney, Agent, or Firm* — Chong IP Law Group

(57) ABSTRACT

A power unit with manual override control for a hydraulic system having an initial state and at least one operational state is provided, comprising: a tank for storing hydraulic fluid that moves between a first chamber and a second chamber of a hydraulic cylinder; a pump that routes the hydraulic fluid in and out of the tank; a first relief valve; a first solenoid valve configured to shift between a plurality of positions based on the at least one operational state of the hydraulic system; a first check valve connected to the first solenoid valve; a manual override control unit comprising: a second check valve; and a second solenoid valve configured to shift between a plurality of positions based on activation of a manual override control, wherein the activation of the manual override control returns the hydraulic system from the at least one operational state to the initial state.

19 Claims, 9 Drawing Sheets

Related U.S. Application Data

(60) Provisional application No. 62/692,569, filed on Jun. 29, 2018.

(56) References Cited

U.S. PATENT DOCUMENTS

| | | | |
|---|---|---|---|
| 10,082,162 B2* | 9/2018 | Wunch | F15B 20/002 |
| 10,527,068 B2* | 1/2020 | Parthasarathy | F15B 1/265 |
| 10,760,599 B2* | 9/2020 | King | F15B 15/18 |
| 11,149,765 B2* | 10/2021 | King | F15B 11/003 |
| 11,486,419 B2* | 11/2022 | King | F15B 15/18 |
| 2019/0234431 A1* | 8/2019 | Tanaka | F15B 11/044 |

* cited by examiner

POWER UNITS WITH MANUAL OVERRIDE CONTROLS FOR HYDRAULIC SYSTEMS

CROSS-REFERENCE TO RELATED APPLICATIONS

This application is a continuation of U.S. Nonprovisional application Ser. No. 17/476,063, filed on Sep. 15, 2021, which is a continuation of U.S. Nonprovisional application Ser. No. 16/984,958, filed on Aug. 4, 2020, now U.S. Pat. No. 11,149,765, issued on Oct. 19, 2021, which is a continuation of U.S. Nonprovisional application Ser. No. 16/458,914, filed on Jul. 1, 2019, now U.S. Pat. No. 10,760,599, issued on Sep. 1, 2020, which claims benefit of U.S. Provisional Application Ser. No. 62/692,569, filed on Jun. 29, 2018. The entire contents of the priority applications are hereby incorporated by reference as if fully set forth herein.

FIELD OF THE INVENTION

The present invention generally relates to hydraulics and more specifically to power units with manual override controls for hydraulic systems.

BACKGROUND

Hydraulics is a technology that dates back for many centuries and includes the use of liquids (i.e., hydraulic fluid) in the application of mechanical properties. At its core, hydraulics may be used for the generation, control, and transmission of power by the use of pressurized hydraulic fluids. Typically, hydraulic fluid is the medium by which power is transferred in hydraulic devices and/or systems. Common hydraulic fluids may be based on mineral oil or water. In practice, hydraulic devices and/or systems may be central parts of various technologies, such as but not limited to, hydraulic brakes, power steering systems, aircraft flight control systems, lifts, dump trucks, and various other mobile and industrial machinery.

SUMMARY OF THE INVENTION

The various embodiments of the present hydraulic power units with manual override controls contain several features, no single one of which is solely responsible for their desirable attributes. Without limiting the scope of the present embodiments, their more prominent features will now be discussed below. In particular, the present hydraulic power units with manual override controls will be discussed in the context of a truck bed equipped with a hydraulic lift (may also be referred to as "dump truck") or a dump trailer that is also known as bumper pull dump trailer, dump trailer, or hydraulic tipper. However, the use of a dump truck/dump trailer is merely exemplary and the present hydraulic power units with manual override controls may be utilized for a variety of hydraulic applications as appropriate to the requirements of a specific hydraulic system (may also be referred to as a "hydraulic device") in accordance with various embodiments of the invention. After considering this discussion, and particularly after reading the section entitled "Detailed Description," one will understand how the features of the present embodiments provide the advantages described here.

One aspect of the present embodiments includes the realization that in current hydraulic systems other than the present embodiments, a hydraulic power unit may malfunction when the hydraulic system is outside a resting state (may also be referred to as "initial state"). In such situations, current hydraulic systems other than the present embodiments may require a hydraulic professional to service the hydraulic device or risk overflowing the hydraulic fluid by forcing the hydraulic system back to its initial state. For example, a power unit that controls a hydraulic cylinder used to raise and lower a truck bed or dump bed may lose power or short circuit. If the power unit malfunctions when the truck bed is in a raised position, the truck bed may be stuck in the raised position. Likewise, if a car lift is in a raised position and the power unit malfunctions, a car may be stuck in the raised position until the power unit can be fixed. In certain applications, power unit malfunctions may be more than just inconvenient. For example, if a wheelchair lift is stuck in a raised position, a person may be stuck in a precarious position that may be extremely dangerous. The present embodiments solve these problem by providing manual override (e.g., manual lowering) controls for hydraulic power units and/or hydraulic systems. The present embodiments thus advantageously enable returning a hydraulic device to an initial resting position without damaging the hydraulic device. The present embodiments provide these advantages and enhancements, as described below.

In a first aspect, a power unit with manual override control for a hydraulic system having an initial state and at least one operational state is provided, the power unit comprising: a tank for storing hydraulic fluid that moves between a first chamber and a second chamber of a hydraulic cylinder, wherein the first chamber of the hydraulic cylinder is connected to an A port of the power unit that is configured to allow the hydraulic fluid to enter and exit the first chamber, and the second chamber of the hydraulic cylinder is connected to a B port of the power unit that is configured to allow the hydraulic fluid to enter and exit the second chamber; a pump connected to a motor having a powered on and a powered off configuration, wherein the motor provides power to the pump to route the hydraulic fluid in and out of the tank in moving the hydraulic fluid between the first chamber and second chamber of the hydraulic cylinder; a first relief valve connected to the pump, wherein the first relief valve is configured to open when pressure across the first relief valve reaches a first relief valve setting; a first solenoid valve connected to the pump, wherein the first solenoid valve is configured to shift between a plurality of positions based on the at least one operational state of the hydraulic system; a first check valve connected to the first solenoid valve, wherein the first check valve allows the hydraulic fluid to flow in one direction and blocks flow in the opposite direction so long as pressure across the first check valve is below a first check valve setting; a second relief valve connected to the first solenoid valve, wherein the second relief valve is configured to open when pressure across the second relief valve reaches a second relief valve setting; a manual override control unit comprising: a second check valve, wherein an open end of the second check valve is connected to the first solenoid valve, and a closed end of the second check valve is connected to the B port, wherein the second check valve is configured to allow hydraulic fluid to flow in one direction and block flow in the opposite direction so long as pressure across the second check valve is below a second check valve setting; and a second solenoid valve connected to the A port, wherein the second solenoid valve is configured to shift between a plurality of positions based on activation of a manual override control, wherein the activation of the manual override control returns the hydraulic system from the at least one operational state to the initial state.

In an embodiment of the first aspect, the plurality of positions of the second solenoid valve includes a first position that loads a control check valve and a second position that loads a control single-directional connector.

In another embodiment of the first aspect, the closed end of the second check valve is connected to a closed end of the first check valve.

In another embodiment of the first aspect, the closed end of the second check valve is connected to a third relief valve that connects to the tank.

In another embodiment of the first aspect, wherein in the initial state: the second solenoid valve is in the first position thereby loading the control check valve and connecting the A port to a closed end of the control check valve; and the first solenoid valve is in a first position, wherein the first position of the first solenoid valve connects the pump to the open end of the second check valve of the manual override control unit.

In another embodiment of the first aspect, the hydraulic fluid in the first chamber is blocked from moving by the closed end of the control check valve and the hydraulic fluid in the second chamber is blocked from moving by the closed end of the second check valve, the closed end of the first check valve, and the third relief valve.

In another embodiment of the first aspect, the at least one operational state includes an extending state, wherein in the extending state: the second solenoid valve is in the first position thereby loading the control check valve; the first solenoid valve is in a second position, wherein the second position of the first solenoid valve connects the pump to the open end of the control check valve; and the motor is in the powered on confirmation providing power to the pump to route the hydraulic fluid from the pump to the open end of the control check valve.

In another embodiment of the first aspect, the hydraulic fluid exits the A port to the first chamber of the hydraulic cylinder thereby placing the hydraulic system in the extending state.

In another embodiment of the first aspect, the hydraulic fluid is pushed out of the second chamber and is routed through: the closed end of the second check valve by overcoming the second check valve setting; the first solenoid valve; and the second relief valve by overcoming the second relief valve setting thereby allowing the hydraulic fluid to flow from the second chamber to the tank.

In another embodiment of the first aspect, the at least one operational state includes a retracting state, wherein in the retracting state: the second solenoid valve is in second position thereby loading the control single-directional connector; the first solenoid valve is in the first position, wherein the first position of the first solenoid valve connects the pump to the closed end of the second check valve; and the motor is in the powered on confirmation providing power to the pump to route the hydraulic fluid from the tank to the first solenoid valve.

In another embodiment of the first aspect, the hydraulic fluid exits the B port to the second chamber of the hydraulic cylinder thereby placing the hydraulic system in the retracting state.

In another embodiment of the first aspect, the hydraulic fluid is pushed out of the first chamber and is routed through: the control single-directional connector; the first solenoid valve; and the second relief valve by overcoming the second relief valve setting thereby allowing the hydraulic fluid to flow from the first chamber to the tank.

In another embodiment of the first aspect, wherein when the manual override is activated: the second solenoid valve is in the second position thereby loading the control single-directional connector; and the first solenoid valve is in the first position, wherein the first position of the first solenoid valve connects the control single-directional connector to the second relief valve and the open end of the first check valve.

In another embodiment of the first aspect, the hydraulic fluid is pushed out of the first chamber due to gravity.

In another embodiment of the first aspect, the hydraulic fluid is pushed out of the first chamber due to a weight of a load.

In another embodiment of the first aspect, the hydraulic fluid in the first chamber is routed through: the control single-directional connector; and the first solenoid valve in its first position that directs the hydraulic fluid through the first solenoid valve to the first check valve.

In another embodiment of the first aspect, the second chamber creates a low pressure vacuum which allows for the hydraulic fluid to be routed out of the B port and into the second chamber.

In another embodiment of the first aspect, wherein an internal pressure within the second chamber builds to overcome the second relief valve setting thereby allowing any remainder of the hydraulic fluid from the first chamber to return to the tank without overflowing the hydraulic system.

In another embodiment of the first aspect, the manual override control is activated by an override input device directly connected to the power unit.

In another embodiment of the first aspect, the manual override control is activated by an override input device wirelessly connected to the power unit.

In a second aspect, a manual override control unit for returning a hydraulic system to an initial state is provided, the manual override control unit comprising: an override input device; a solenoid valve configured to connect to the hydraulic system, wherein the solenoid valve shifts between a first position and a second position, wherein the first position of the solenoid valve loads a control check valve having an open end and a closed end, and wherein the second position of the solenoid valve loads a control single-directional connector; and wherein the activation of the override input device returns the hydraulic system to the initial state.

In an embodiment of the second aspect, the manual override control unit further comprises a check valve comprising an open end and a closed end, wherein the closed end of the check valve is configured to connect to the hydraulic system and wherein the check valve is configured to allow hydraulic fluid to flow in one direction and block flow in an opposite direction so long as pressure across the check valve is below a check valve setting.

In another embodiment of the second aspect, the hydraulic system comprises a hydraulic cylinder comprising a first chamber and a second chamber.

In another embodiment of the second aspect, the solenoid valve is configured to connect to the first chamber of the hydraulic cylinder and the closed end of the check valve is configured to connect to the second chamber of the hydraulic cylinder.

In another embodiment of the second aspect, the hydraulic cylinder includes an extending state.

In another embodiment of the second aspect, wherein in the extending state the solenoid valve is in the first position thereby loading the control check valve, and wherein the closed end of the control check valve is configured to connect to the first chamber.

In another embodiment of the second aspect, the hydraulic fluid is routed through the open end of the control check valve and enters the first chamber of the hydraulic cylinder.

In another embodiment of the second aspect, the hydraulic fluid exits the second chamber and is routed through the closed end of the check valve by overcoming the check valve setting.

In another embodiment of the second aspect, the hydraulic cylinder includes a retracting state.

In another embodiment of the second aspect, wherein in the retracting state the solenoid valve is in the second position thereby loading the control single-directional connector.

In another embodiment of the second aspect, the hydraulic fluid is routed through the open end of the check valve and enters the second chamber of the hydraulic cylinder.

In another embodiment of the second aspect, the hydraulic fluid exits the first chamber and is routed through the control single-directional connector.

In another embodiment of the second aspect, wherein when the override input device is activated, the solenoid valve is in the second position thereby loading the control single-directional connector.

In another embodiment of the second aspect, the hydraulic fluid exits the first chamber with assistance from gravity.

In another embodiment of the second aspect, the hydraulic fluid exiting the first chamber is routed through the control single-directional connector.

In another embodiment of the second aspect, the hydraulic fluid exiting the first chamber creates a low pressure vacuum in the second chamber.

In another embodiment of the second aspect, the low pressure vacuum in the second chamber causes the hydraulic fluid to enter the second chamber.

In another embodiment of the second aspect, wherein an internal pressure within the second chamber increases to overcome at least one relief valve setting to allow hydraulic fluid to exit from the first chamber without overflowing the hydraulic system.

In another embodiment of the second aspect, the override input device is activated via a direct connection.

In another embodiment of the second aspect, the override input device is activated via a wireless connection.

In a third aspect, a power unit with manual override control for a hydraulic device having an initial state is provided, the power unit comprising: a tank for storing hydraulic fluid that moves between a first chamber and a second chamber of the hydraulic device; a pump configured to connect to a motor having a powered on and a powered off configuration, wherein the motor provides power to the pump to route the hydraulic fluid in and out of the tank in moving the hydraulic fluid between the first chamber and second chamber of the hydraulic device; and a manual override control unit, wherein activation of the manual override control unit returns the hydraulic device to the initial state.

In an embodiment of the third aspect, the power unit further comprises an A port, wherein the A port is configured to connect to the first chamber of the hydraulic device to allow the hydraulic fluid to enter and exit the first chamber and a B port, wherein the B port is configured to connect to the second chamber of the hydraulic device to allow the hydraulic fluid to enter and exit the second chamber.

In another embodiment of the third aspect, the manual override control unit comprises a solenoid valve configured to connect to the first chamber of the hydraulic device, wherein the solenoid valve includes a first position and a second position.

In another embodiment of the third aspect, the first position of the solenoid valve loads a control check valve having an open end and a closed end.

In another embodiment of the third aspect, the second position of the solenoid valve loads a control single-directional connector.

In another embodiment of the third aspect, the activation of the manual override control unit shifts the solenoid valve between the first position and the second position.

In another embodiment of the third aspect, the activation of the manual override control unit causes hydraulic fluid to exit the first chamber.

In another embodiment of the third aspect, the hydraulic fluid exits the first chamber with assistance from gravity.

In another embodiment of the third aspect, the hydraulic fluid exiting the first chamber is routed to the tank.

In another embodiment of the third aspect, the hydraulic fluid exiting the first chamber creates a low pressure vacuum in the second chamber.

In another embodiment of the third aspect, the low pressure vacuum in the second chamber causes the hydraulic fluid to enter the second chamber.

In another embodiment of the third aspect, an internal pressure within the second chamber increases to apply pressure for the hydraulic fluid to route to the tank.

In another embodiment of the third aspect, the power unit further comprises at least one relief valve, wherein the at least one relief valve is configured to open when pressure across the at least one relief valve reaches a relief valve setting of the at least one relief valve.

In another embodiment of the third aspect, the hydraulic fluid exiting the first chamber creates pressure to overcome the relief valve setting of the at least one relief valve allowing hydraulic fluid to route to the tank.

In another embodiment of the third aspect, the manual override control unit further comprises a check valve comprising an open end and a closed end, wherein the closed end of the check valve is configured to connect to the second chamber of the hydraulic device and wherein the check valve is configured to allow hydraulic fluid to flow in one direction and block flow in an opposite direction so long as pressure across the check valve is below a check valve setting.

In another embodiment of the third aspect, the power unit further comprises a solenoid valve connected to the pump having a first position a second position.

In another embodiment of the third aspect, the solenoid valve connected to the pump connects the pump to the open end of the check valve when the manual override control unit is activated.

In another embodiment of the third aspect, the manual override control unit further comprises an override input device.

In another embodiment of the third aspect, the override input device is activated via a direct connection.

In another embodiment of the third aspect, the override input device is activated via a wireless connection.

In a fourth aspect, a power unit with manual override control for a hydraulic device having an initial state, the power unit comprising: a tank for storing hydraulic fluid that moves between a first chamber and a second chamber of the hydraulic device; a pump configured to connect to a motor having a powered on and a powered off configuration, wherein the motor provides power to the pump to route the hydraulic fluid in and out of the tank in moving the hydraulic fluid between the first chamber and second chamber of the hydraulic device; and a manual override control unit comprising a control single-directional connector, wherein activation of the manual override control unit returns the hydraulic device to the initial state.

In an embodiment of the fourth aspect, the power unit further comprises an A port, wherein the A port is configured to connect to the first chamber of the hydraulic device to allow the hydraulic fluid to enter and exit the first chamber and a B port, wherein the B port is configured to connect to the second chamber of the hydraulic device to allow the hydraulic fluid to enter and exit the second chamber.

In another embodiment of the fourth aspect, the manual override control unit further comprises a control check valve having an open end and a closed end.

In another embodiment of the fourth aspect, the closed end of the control check valve is connected to the first chamber prior to the activation of the manual override control unit.

In another embodiment of the fourth aspect, the activation of the manual override control unit causes the control single-directional connector to connect to the first chamber of the hydraulic device.

In another embodiment of the fourth aspect, the connection of the control single-directional connector to the first chamber allows hydraulic fluid to exit the first chamber.

In another embodiment of the fourth aspect, the hydraulic fluid exits the first chamber with assistance from gravity.

In another embodiment of the fourth aspect, the hydraulic fluid exiting the first chamber is routed to the tank.

In another embodiment of the fourth aspect, the hydraulic fluid exiting the first chamber creates a low pressure vacuum in the second chamber.

In another embodiment of the fourth aspect, the low pressure vacuum in the second chamber causes the hydraulic fluid to enter the second chamber.

In another embodiment of the fourth aspect, wherein an internal pressure within the second chamber increases to apply pressure for the hydraulic fluid to route to the tank.

In another embodiment of the fourth aspect, the power unit further comprises at least one relief valve, wherein the at least one relief valve is configured to open when pressure across the at least one relief valve reaches a relief valve setting of the at least one relief valve.

In another embodiment of the fourth aspect, the hydraulic fluid exiting the first chamber creates pressure to overcome the relief valve setting of the at least one relief valve allowing hydraulic fluid to route to the tank.

In another embodiment of the fourth aspect, the manual override control unit further comprises a check valve comprising an open end and a closed end.

In another embodiment of the fourth aspect, the closed end of the check valve is configured to connect to the second chamber of the hydraulic device and wherein the check valve is configured to allow hydraulic fluid to flow in one direction and block flow in an opposite direction so long as pressure across the check valve is below a check valve setting.

In another embodiment of the fourth aspect, the power unit further comprises a solenoid valve connected to the pump having a first position and a second position.

In another embodiment of the fourth aspect, the solenoid valve connected to the pump connects the pump to the open end of the check valve.

In another embodiment of the fourth aspect, the manual override control unit further comprises an override input device.

In another embodiment of the fourth aspect, the override input device is activated via a direct connection.

In another embodiment of the fourth aspect, the override input device is activated via a wireless connection.

BRIEF DESCRIPTION OF THE DRAWINGS

The various embodiments of the present hydraulic power units with manual lowering controls now will be discussed in detail with an emphasis on highlighting the advantageous features. These embodiments depict the novel and non-obvious hydraulic power units with manual lowering controls shown in the accompanying drawings, which are for illustrative purposes only. These drawings include the following figures.

DETAILED DESCRIPTION OF THE DRAWINGS

Figure 1:
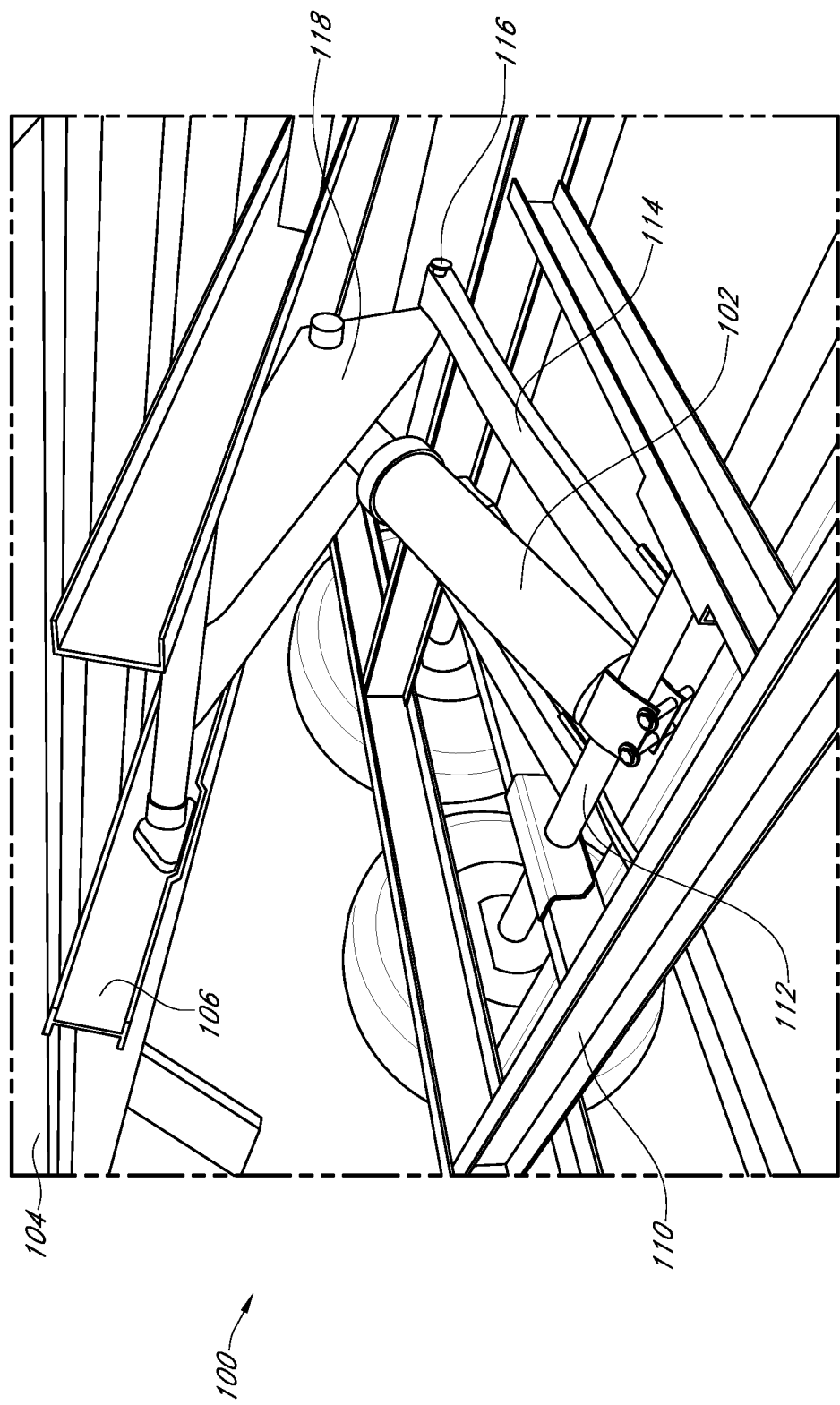
FIG. 1 illustrates a dump truck/trailer utilizing a dual-acting hydraulic cylinder for lifting a truck bed in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, hydraulic power units with manual override controls (may also be referred to as "power units") in accordance with embodiments of the invention are disclosed. In many embodiments, hydraulic power units with manual override controls may be connected to one or more hydraulic devices, such as but not limited to a hydraulic cylinder. In various embodiments, the hydraulic power units with manual override controls may be part of a larger hydraulic system. In several embodiments, hydraulic power units with manual override controls may include a manifold connected to a motor (e.g., DC powered motor) that powers a pump for regulating fluid flow between various components in the hydraulic system, as further described below. In many embodiments, the hydraulic power units may include a manual override control unit that allows an operator to override the hydraulic system's current state and return the system back to an initial state. Hydraulic systems utilizing dual-acting cylinders in accordance with embodiments of the invention are further discussed below.

Dump Trucks with Dual-Acting Hydraulic Cylinders

A variety of systems may use hydraulic cylinders to provide a directional force using pressurized hydraulic fluid (may also be referred to as "fluid"). Typically, a hydraulic cylinder may include a cylinder barrel in which a piston is connected to a piston rod that may move back and forth as the piston moves back and forth within the cylinder barrel. By connecting the piston rod to an external structure, the force generated by the pressurized hydraulic fluid may be applied to the external structure. In dual-acting hydraulic cylinders, the hydraulic barrel may include a first chamber (blind end or barrel end) and a second chamber (may also be referred to as "rod end") separated by the piston, where the first chamber may have a first pressure level and the second chamber may have a second pressure level. As further described below, the first and second chambers may be connected by a hydraulic power unit with manual override control configured to move the hydraulic fluid between the first and second chambers.

A dump truck utilizing a dual-acting hydraulic cylinder for lifting a truck trailer bed in accordance with an embodiment of the invention is illustrated in FIG. 1. The dump truck 100 may include a dual-acting hydraulic cylinder 102 for lifting a truck bed 104. The dump truck 100 may also include a frame 110 having a bar 112 that connects to one side of the hydraulic cylinder 102 (may also be referred to as "blind end"). One of ordinary skill in the art would recognize that Direct Push and Scissor Hoist are two common methods of raising the dump bed (shown in FIG. 1 is a Scissor Hoist). In addition, the truck bed 104 may be connected to a frame 106 that attaches to a lift arm having a first portion 114, a joint 116, and a second portion 118. In various embodiments, a piston rod may extend from a rod end of the hydraulic cylinder 102 and connect to the second portion 118 of the lift arm. In several embodiments, the lift arm may be configured to receive force from the hydraulic cylinder 102 via the piston rod to raise or lower the truck bed 104, as further described below.

As described above, a dual-acting hydraulic cylinder may have two chambers (e.g., a first chamber barrel or blind end and a second chamber or rod end) that may be connected by a power unit for moving hydraulic fluid between the chambers for raising or lowering the truck bed 104. For example, the first chamber may have a first port (may also be referred to as "bottom port") that connects to a corresponding first port of the power unit (may also be referred to as "A port") for allowing the hydraulic fluid to enter and exit the first chamber. Further, the second chamber may also include a second port (may also be referred to as "top port") that connects to a corresponding second port of the power unit (may also be referred to as "B port") for allowing the hydraulic fluid to enter and exit the second chamber.

Figure 2A:
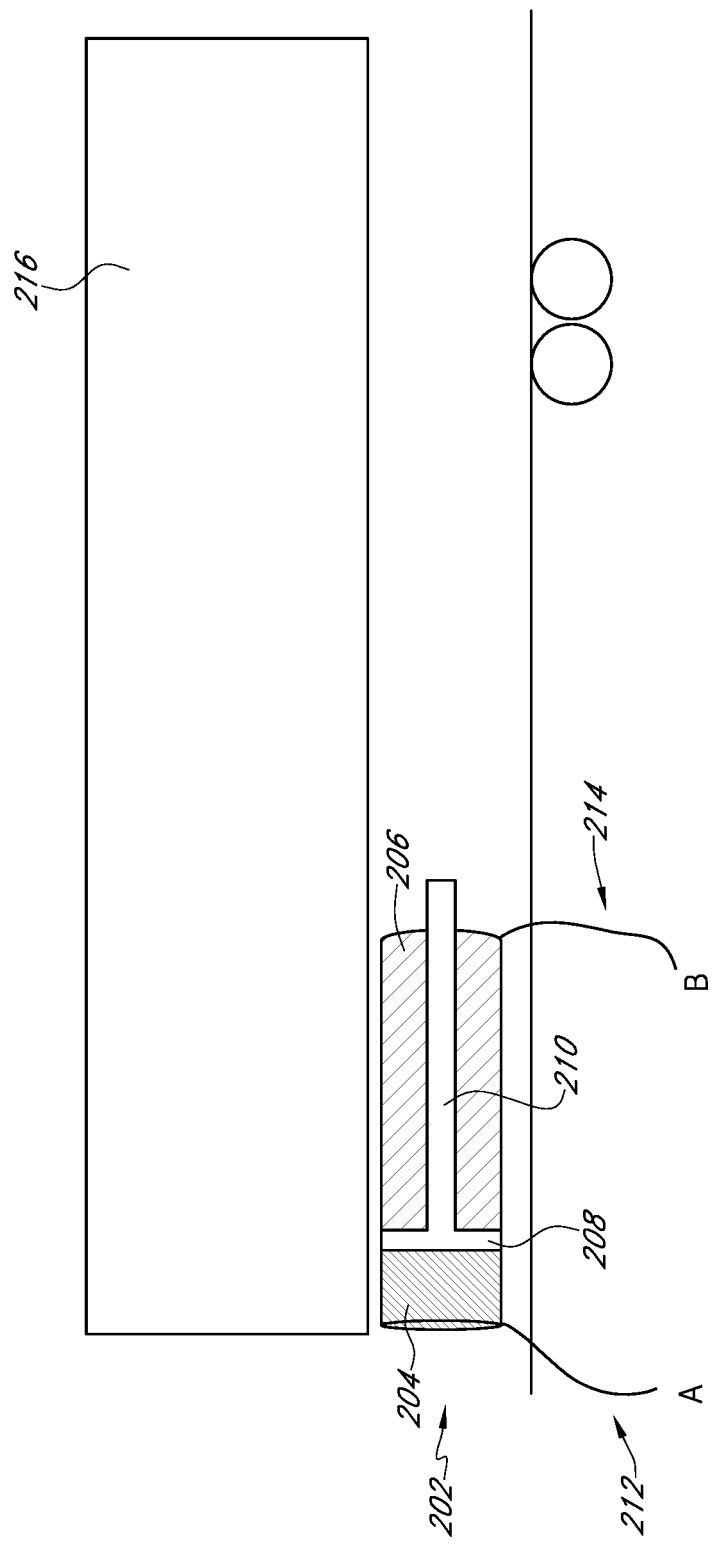
FIGS. 2A-C illustrate a dual-acting hydraulic cylinder in various states relative to positions of a truck bed in accordance with an embodiment of the invention.
Figure 2B:
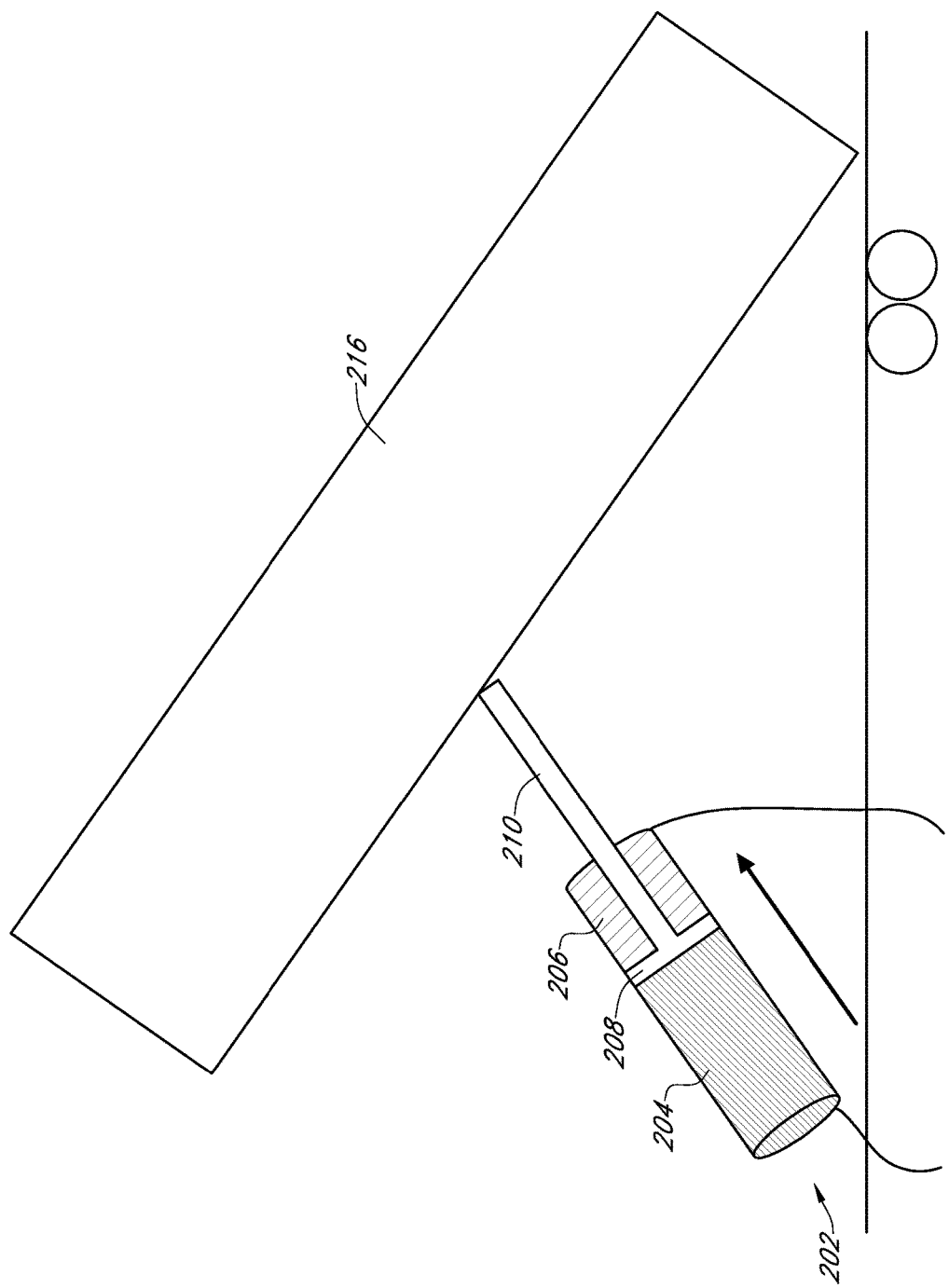
Figure 2C:
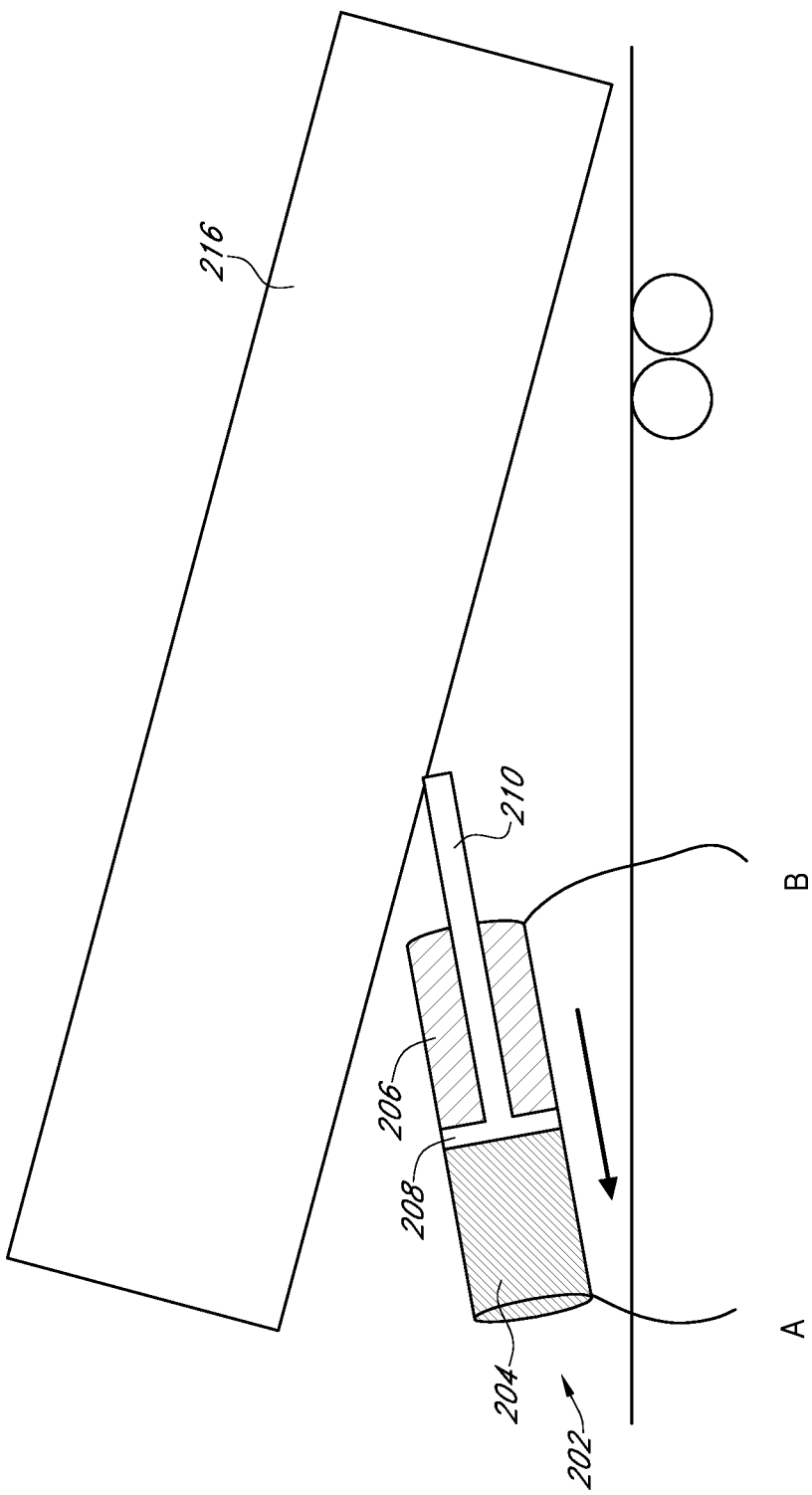

A dual-acting hydraulic cylinder in various states relative to positions of a truck bed in accordance with an embodiment of the invention is illustrated in FIGS. 2A-C. In reference to FIG. 2A, the truck bed 216 is level and the hydraulic cylinder 202 is in its initial state. In many embodiments, the hydraulic cylinder 202 may include a first chamber 204 and a second chamber 206 separate by a piston 208. The piston 208 may be connected to a piston rod 210 that extends out from the second chamber 206 to attach to a structural device (not illustrated, such as but not limited to a lift arm) connected to the truck trailer bed 216 or directly to the truck bed 216. In addition, the first chamber 204 may have a bottom port connected to a first hydraulic tube 212 (may also be referred to as "first hose") that connects to an A port of a power unit, as further described below. Likewise, the second chamber 206 may have a top port connected to a second hydraulic tube 214 (may also be referred to as "second hose") that connects to a B port of a power unit, as further described below. In the initial state, the piston may be positioned such that the amount of hydraulic fluid in the first chamber 204 is less than when the hydraulic cylinder is in operation. For illustrative purposes, the hydraulic fluid in the first chamber 204 is shown relatively smaller than the hydraulic fluid in the second chamber 206.

In reference to FIG. 2B, the hydraulic cylinder 202 is raising the truck bed 216. In such embodiments, the hydraulic fluid is transferred from second chamber 206 to the first chamber 204 via the power unit (not illustrated) resulting in the piston 208 and thus the piston rod 210 actuating (e.g., extending) and thus lifting the truck bed 216. During the process of lifting, the piston 208 moves such that the piston rod 210 extends out and away from the rod end of the hydraulic cylinder 202. In many embodiments, the raising process may be initiated by an operator providing an input to the power unit, such as but not limited to, pressing an "up" button, as further described below. The user may stop the raising process by providing an input to the power unit, such as but not limited to, releasing the up button. In such embodiments, the power unit may stop the movement of the hydraulic fluid from the second chamber 206 and the first chamber 204 and thus the truck bed 216 may be stopped at a particular position.

In reference to FIG. 2C, the hydraulic cylinder 202 is lowering the truck bed 216. In such embodiments, the hydraulic fluid is transferred from first chamber 204 to the second chamber 206 via the power unit (not illustrated) resulting in the piston 208 and thus the piston rod 210 retracting and thus lowering the truck bed 216. During the process of lowering, the piston 208 moves such that the piston rod 210 retracts towards the blind end of the hydraulic cylinder 202. In many embodiments, the lowering process may be initiated by an operator providing an input to the power unit, such as but not limited to, pressing a "down" button, as further described below. The user may stop the lowering process by providing an input to the power unit, such as but not limited to, releasing the down button. In such embodiments, the power unit may stop the movement of the hydraulic fluid from the first chamber 204 to the second chamber 206 and thus the truck bed 216 may be stopped at a particular position.

Although specific hydraulic systems for dump trucks using dual-acting hydraulic cylinders are discussed above with respect to FIGS. 1-2C, any of a variety of systems using various hydraulic devices as appropriate to the requirements of a specific application can be utilized in accordance with embodiments of the invention. Power units with manual override controls in accordance with embodiments of the invention are discussed further below.

Power Units with Manual Override Controls

Hydraulic power units may be connected to hydraulic cylinders to drive the movement of pistons within a cylinder barrel. Further, power units in accordance with embodiments of the invention may include a manual override control to return a hydraulic cylinder to an initial state when the power unit is malfunctioning.

Figure 3:
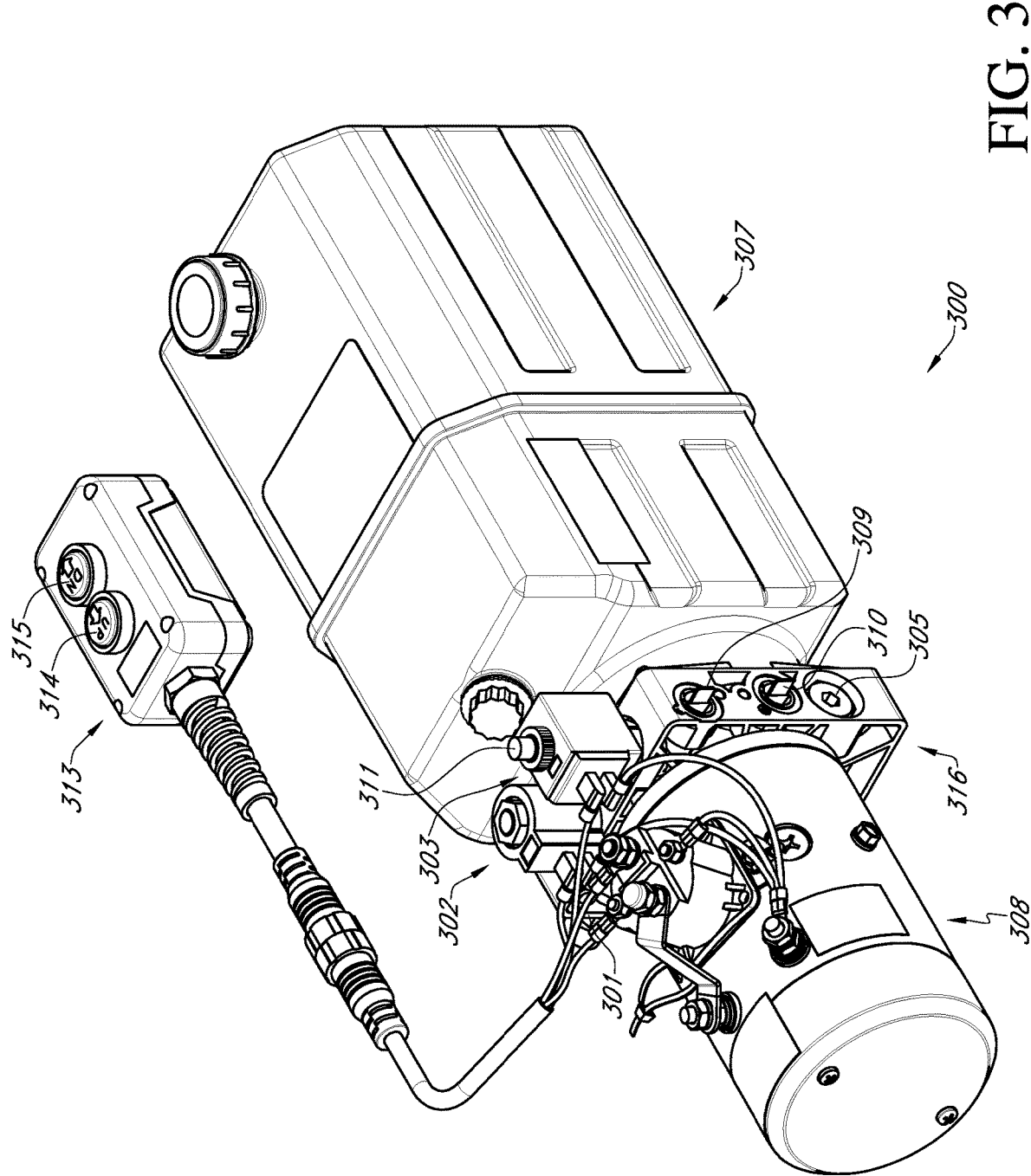
FIG. 3 illustrates a hydraulic power unit with manual lowering control in accordance with an embodiment of the invention.

A hydraulic power unit with manual override control in accordance with an embodiment of the invention is illustrated in FIG. 3. The power unit 300 may include manifold 316 having an A port 309 that connects to a corresponding bottom port of a hydraulic cylinder via a first hose, as described above. Likewise, the manifold 316 may include a B port 310 that connects to a corresponding top port of a hydraulic cylinder, as described above. In many embodiments, the power unit 300 may also include a tank 307 that connects to a pump (not illustrated) that may be driven by a motor 308. In some embodiments, the pump may be built into the tank 307 or connected to the tank 307. In several embodiments, the pump may be a hydraulic gear pump and the motor 308 may be an electric DC powered motor. In operation, the motor 308 may turn the pump (not illustrated) and the pump push hydraulic fluid out of the tank 307 for moving hydraulic fluid between the first and second chambers of a dual-acting hydraulic cylinder, as further described below. In various embodiments, the tank 307 may also act as a reservoir for receiving hydraulic fluid within the system. The power unit 300 may include a controller 313 having an up button 314 and a down button 315, as described above. In many embodiments, the up button 314 may configure the power unit 300 to raise the truck bed and the down button 315 may configure the power unit 300 to lower the truck bed.

In further reference to FIG. 3, the manifold 316 may include a first relief valve 301 (may also be referred to as "main relief valve") that may be normally closed but configured to open if the pressure across the first relief valve 301 reaches a valve setting. For example, the first relief valve 301 may be an adjustable cartridge relief valve that may have an adjustable valve setting from 1 pound per square inch ("PSI") to 5000 PSI. The manifold 316 may also include a first solenoid valve 302 that may shift between two or more positions based on an operators desired functionality of the hydraulic cylinder (e.g. raise or lower). For example, the first solenoid valve 302 may be a cartridge 4-way, 2-position solenoid valve (or in some cases, a cartridge 4-way, 3-position solenoid valve) that may take a first position when raising the truck bed and take a second position when lowering the truck bed, as further described below. In some embodiments, the first solenoid valve 302 may be a separate component connected to the manifold 316 or may be an integral part of the manifold 316. The manifold 316 may also include a first check valve 305 that allows hydraulic fluid to flow in one direction but blocks flow in the opposite direction so long as pressure across the first check valve 305 is below a valve setting, as further described below. In some embodiments, the first check valve 305 may be a cartridge check valve with a valve setting 1 PSI to 3000 PSI. The manifold 316 may include additional hydraulic components, such as but not limited to, a second relief valve (not illustrated) that may be a cartridge relief valve adjustable from 1 PSI to 5000 PSI and/or a third relief valve (not illustrated) that may be a cartridge relief valve adjustable from 1 PSI to 5000 PSI.

In further reference to FIG. 3, the manifold 316 may also include a manual override control unit 303 for lowering the truck bed when the power unit malfunctions. In many embodiments, the control unit 303 may include a second solenoid valve (not illustrated) (may also be referred to as "cartridge A & B port load holding solenoid valve") with a manual override function, as further described below. The control unit 303 may further include a second check valve (not illustrated). In various embodiments, the manual override function may be activated by an override input device 311, such as but not limited to, a button, a twist cap, etc. In some embodiments, the override input device 311 may be directly connected (e.g., via wires) to the control unit 303 or may be connected wireless using a variety of methods known to one of skill in the art, such as but not limited to, Bluetooth or WiFi. In further reference to the control unit 303, the second solenoid valve may include a first position that allows the truck bed to maintain a static position (e.g., initial state) or to be raised, as further described below. Moreover, the second solenoid valve 303 may include a second position that allows the truck bed to be lowered, as further described below. In addition, an operator may activate the manual override function using the override input device 311 and thereby place the second solenoid valve 303 in the second position to lower the truck bed, as further described below.

Although specific power units with manual override controls are discussed above with respect to FIG. 3, any of a variety of power units with manual override controls including power units with a variety of hydraulic components as appropriate to the requirements of a specific application can be utilized in accordance with embodiments of the invention. Further, although specific hydraulic components are illustrated as part of or connected to other components, the various hydraulic components may be either a part of or connected to other components as appropriate to the requirements of a specification application in accordance with embodiments of the invention. Power units at initial states in accordance with embodiments of the invention are discussed further below.

Hydraulic Power Units with Manual Override Controls at Initial States

As described above, a power unit may include a motor, pump, tank, and various hydraulic components for moving hydraulic fluid between first and second chambers of a dual-acting hydraulic cylinder. In the initial state, the power unit typically is not providing power to the hydraulic cylinder and the truck bed is static in the fully lowered position.

Figure 4:
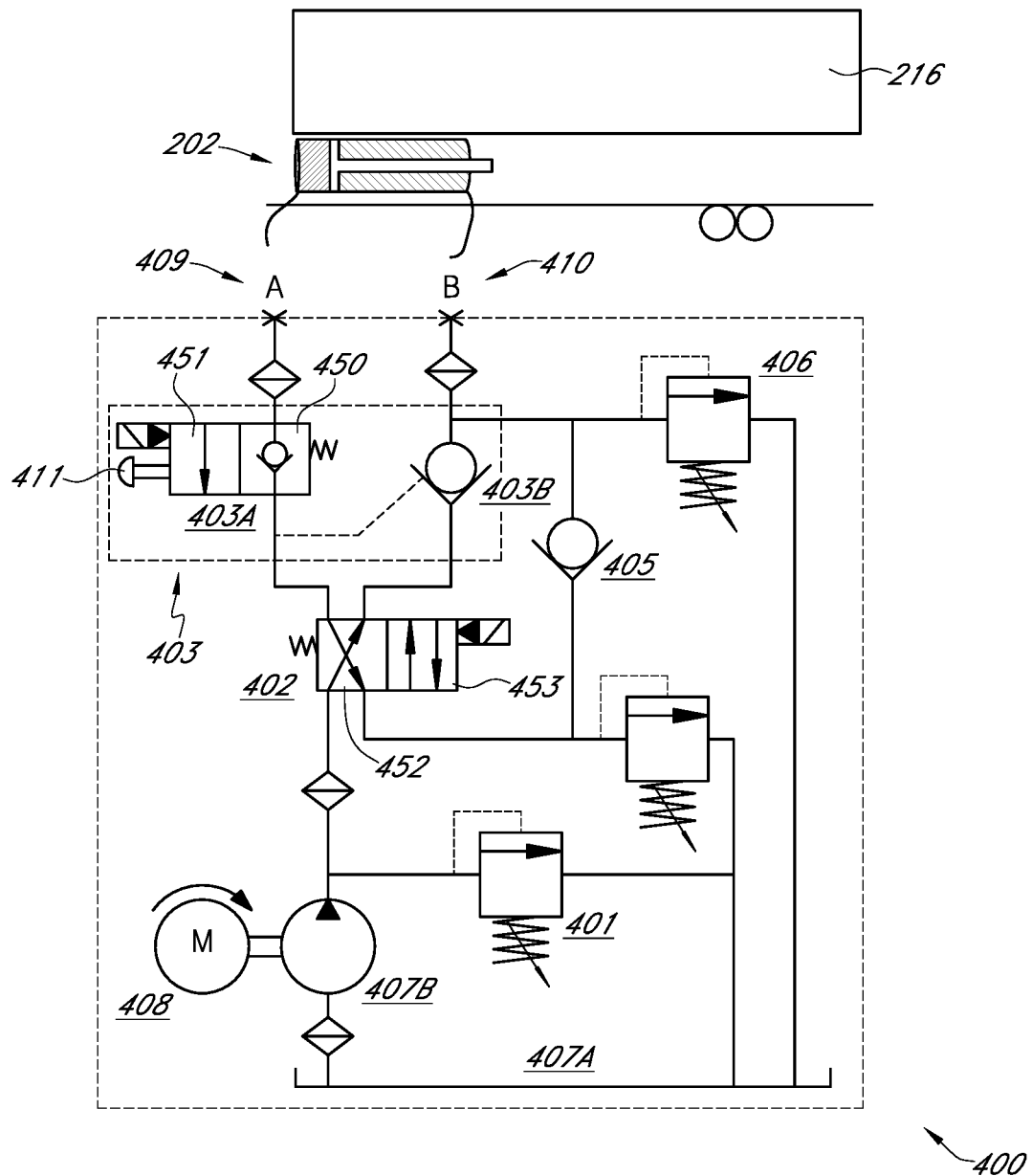
FIG. 4 is a schematic diagram illustrating a hydraulic power unit with manual lowering control when a hydraulic cylinder is at rest (e.g., all cartridge valves are at de-energized position or also known as neutral state) in accordance with an embodiment of the invention.

A schematic diagram illustrating a hydraulic power unit with manual override control at an initial state in accordance with an embodiment of the invention is illustrated in FIG. 4. The schematic diagram 400 of the power unit is shown connected to a hydraulic cylinder 202 with a truck bed 216 in a fully lowered position. In the initial resting state, a motor 408 is not powered and a pump 407B that may push hydraulic fluid from a tank 407A and between the first chamber and the second chamber of the hydraulic cylinder is not activated. In various embodiments, the pump 407B may route fluid to a first relief valve 401. The pump 407B may also be connected to a first solenoid valve 402 having a first position 452 and a second position 453, as further described below. In the initial state, the first solenoid valve 402 may be in the first position 452 connecting the pump 407B to an open end (i.e., free flow direction end) of a second check valve 403B of a manual override control unit 403. In many embodiments, the closed end (i.e., blocked flow direction) of the second check valve 403B may be connected to a B port 410 via a second hose. In some embodiments, the closed end of the second check valve 403B may also be connected to a closed end of a first check valve 405. In some embodiments, the closed end of the second check valve 403B may also be connected to a third cartridge relief valve 406 that connects to the tank 407A.

In further reference to FIG. 4, the first chamber may be connected to the power unit by connecting a bottom port of the hydraulic cylinder with an A port 409 of the power unit via a first hose. In many embodiments, the A port 409 may be connected to a second solenoid valve 403A of the manual override control unit 403, wherein the solenoid valve 403A may have a first position and a second position. In various embodiments, the first position may include loading a control check valve 450 for the second solenoid valve 403A and the second position that may loading a control single-directional connector 451 for the second solenoid valve 403A. In the initial state, the second solenoid valve 403A may be in the first position and thus connect the A port 409 to a closed end of the control check valve 450. In this configuration, the hydraulic cylinder 202 is kept static since the hydraulic fluid in the first chamber is blocked from moving by the control check valve 450 of the solenoid 403A in its first position and the hydraulic fluid in the second chamber is blocked from moving by the closed end of the second check valve 403B, the closed end of the first check valve 405, and the third relief valve 406. In various embodiments, the control unit 403 may also include an override input device 411, as further described below.

Although specific hydraulic power units with manual override controls at initial states for dump trucks are discussed above with respect to FIG. 4, any of a variety of hydraulic power units with manual override controls including power units with manual override controls for various hydraulic systems as appropriate to the requirements of a specific application can be utilized in accordance with embodiments of the invention. Further, although various components (e.g., tank, pump, valves) are discussed above with respect to FIG. 4, any of a variety of components as appropriate to the requirements of a specific application can be utilized in accordance with embodiments of the invention. For example, various components discussed above with respect to FIG. 4 could be interchanged as appropriate to the requirements of a specific application in accordance with embodiments of the invention. Further, although specific valve setting values are discussed above with respect to FIG. 4, various valve setting values as appropriate as appropriate to the requirements of a specific application can be utilized in accordance with embodiments of the invention. Raising and lowering truck beds using power units with manual override controls in accordance with embodiments of the invention are discussed further below.

Raising and Lowering Truck Beds with Hydraulic Power Units

Figure 5:
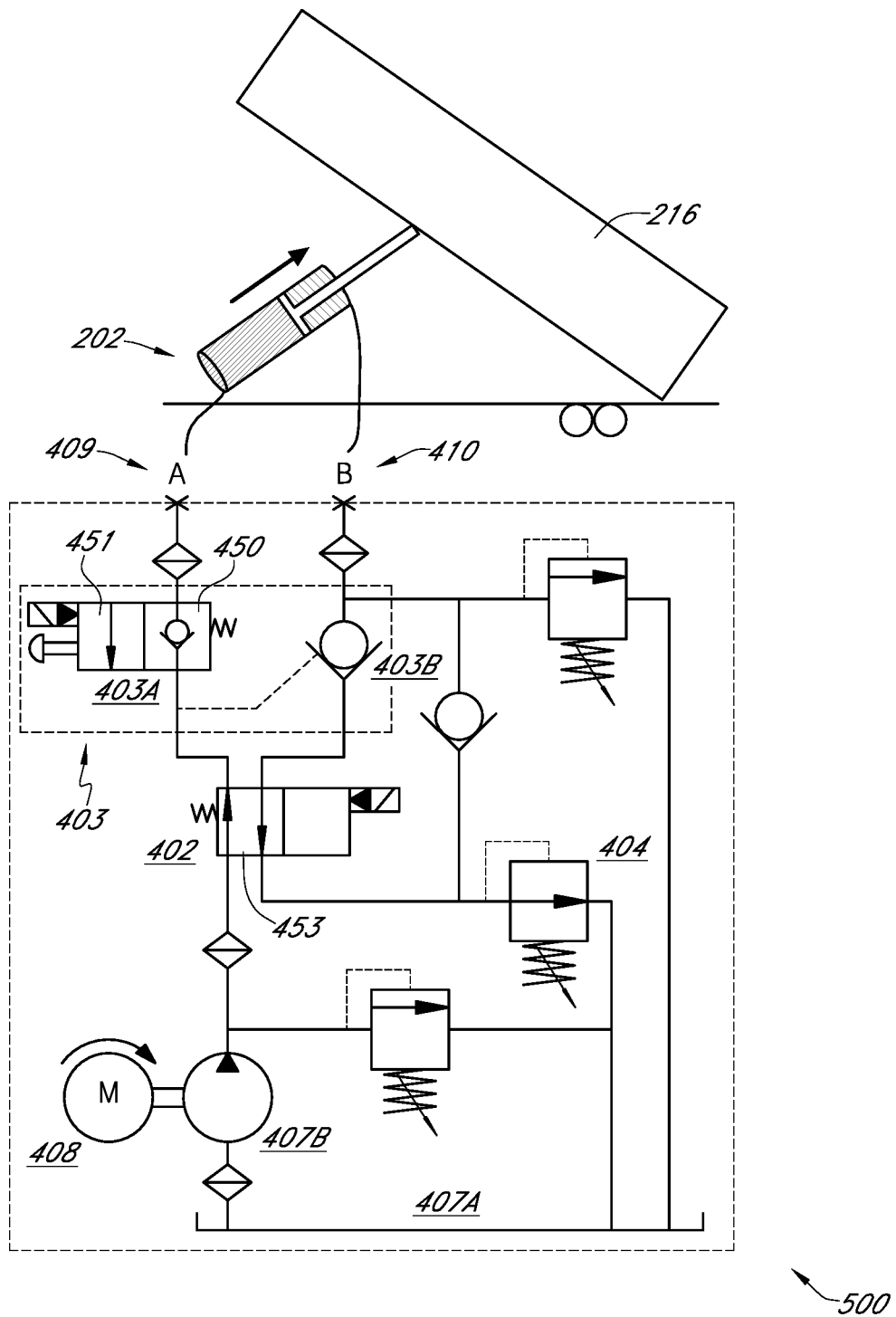
FIG. 5 is a schematic diagram illustrating a hydraulic power unit with manual lowering control when a hydraulic cylinder is raising a truck/trailer bed in accordance with an embodiment of the invention.

A power unit with manual override control may be configured to activate a hydraulic cylinder to raise or lower a truck bed by transitioning hydraulic fluid between a first and second chambers of a hydraulic cylinder and a tank of the power unit. A schematic diagram illustrating a hydraulic power unit with manual override control when the hydraulic cylinder is raising a truck bed in accordance with an embodiment of the invention is illustrated in FIG. 5. The schematic diagram 500 of the power unit is shown connected to a hydraulic cylinder 202 with a raising truck bed 216. In many embodiments, the motor 408 may be powered on and provide power to the pump 407B thereby turning the pump 407B and routing fluid from the tank 407A to the first solenoid valve 402 in a second position 453. For example, in various embodiments, the first solenoid valve 402 may energize and transition from the first position 452 to the second position 453 and allow the fluid from the pump 407B to be directed to the open end of the control check valve 450 of the second solenoid 403A in its first position. The hydraulic fluid may then exit the A port 409 through a first hose connecting the A port 409 to the bottom port of the hydraulic cylinder. Thus, the hydraulic fluid may enter through the blind end of the cylinder and apply additional force on to the piston to extend the piston rod raising the truck bed.

In further reference to FIG. 5, since this is a double acting cylinder, there is hydraulic fluid in the second chamber may be returned back to the tank 407A. In many embodiments, the hydraulic fluid from the second chamber may get pushed out of the top port of the hydraulic cylinder though a second hose connecting to the B port 410 of the power unit. In such embodiments, the hydraulic fluid may be routed through the check valve 403B and through Cartridge 4W2P solenoid valve 402 in first position 452 and overcome the preset pressure of a second relief valve 404 and allow the hydraulic fluid to flow through second relief valve 404 and return back to the tank 407A.

Figure 6:
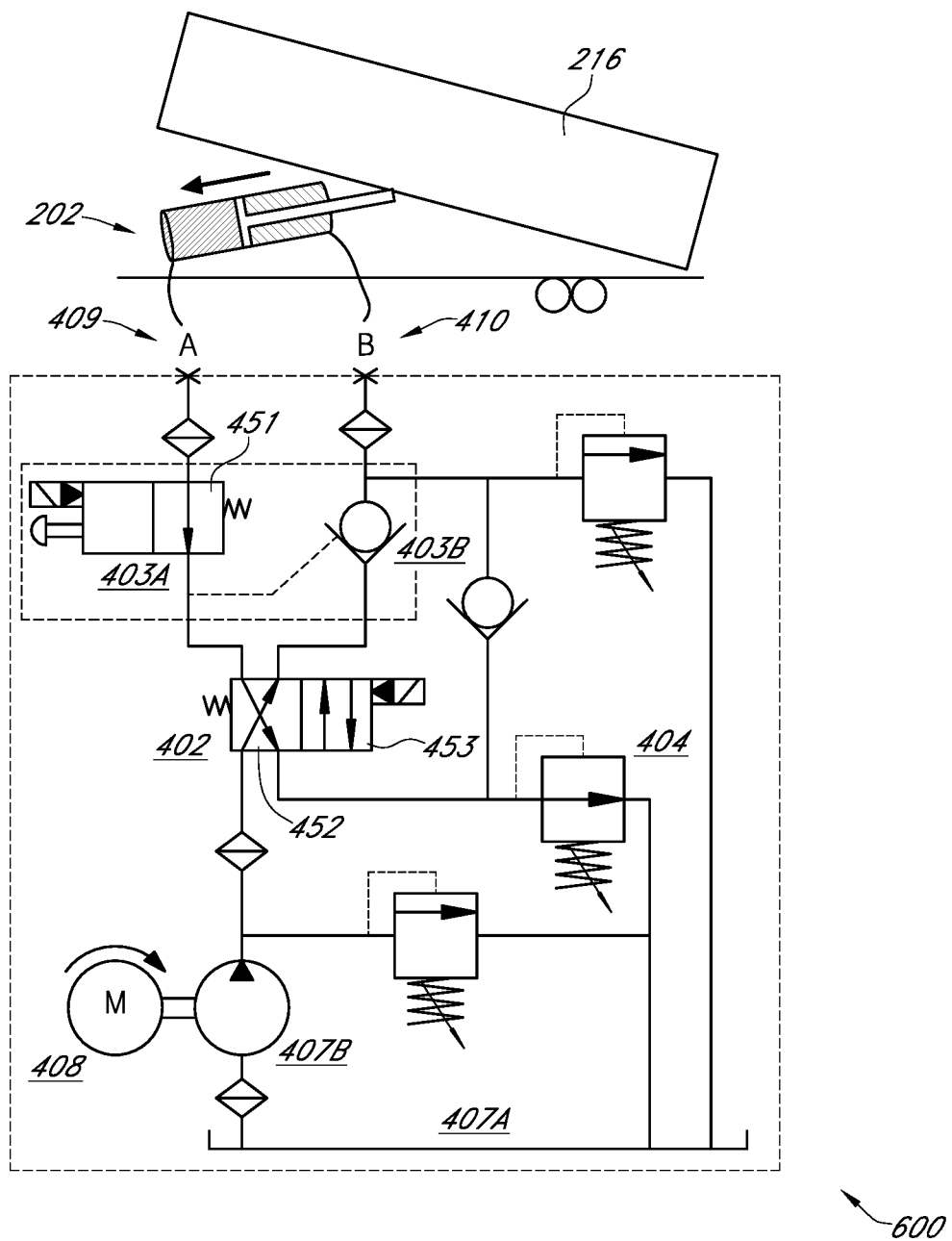
FIG. 6 is a schematic diagram illustrating a hydraulic power unit with manual override control when a hydraulic cylinder is lowering a truck bed in accordance with an embodiment of the invention.

A schematic diagram illustrating a hydraulic power unit with manual override control when the hydraulic cylinder is lowering a truck bed in accordance with an embodiment of the invention is illustrated in FIG. 6. The schematic diagram 600 of the power unit is shown connected to a hydraulic cylinder 202 with a lowering truck bed 216. In many embodiments, the motor 408 may be powered on and provide power to the pump 407B thereby turning the pump 407B and routing fluid from the tank 407A to the first solenoid valve 402 in a first position 452. For example, in various embodiments, the first solenoid valve 402 may energize and transition from the second position 453 to the first position 452 and allow the hydraulic fluid to flow from pump 407B and be directed to the open end of the second check valve 403B. The hydraulic fluid may then exit the B port 410 through a second hose connecting the B port 410 of the power unit to the top port of the hydraulic cylinder. The hydraulic fluid may enter through the rod end of the cylinder and apply additional force onto the piston to retract the piston rod lowering the truck bed.

In further reference to FIG. 6, since this is a double acting cylinder, the hydraulic fluid in the first chamber may be returned back to the tank 407A. In many embodiments, the hydraulic fluid from the first chamber may get pushed out of the bottom port of the hydraulic cylinder though a first hose connecting to the A port 409 of the power unit. In such embodiments, the second solenoid valve 403A may be in a second position (i.e., loading a control single-directional connector 451) that allows hydraulic fluid to flow through the second solenoid valve 403A and routes the fluid to the first solenoid 402 in its first position 452. In various embodiments, the first position 452 of the first solenoid 402 routes the fluid to overcome the preset pressure of the second relief valve 404 and allows the hydraulic fluid to flow through second relief valve 404 and return back to the tank 407A.

Although specific hydraulic power units with manual override controls for raising and lowering truck beds are discussed above with respect to FIGS. 5-6, any of a variety of hydraulic power units with manual override controls for various hydraulic systems as appropriate to the requirements of a specific application can be utilized in accordance with embodiments of the invention. Further, although various components (e.g., tank, pump, valves) are discussed above with respect to FIGS. 5-6, any of a variety of components as appropriate to the requirements of a specific application can be utilized in accordance with embodiments of the invention. For example, various components discussed above with respect to FIGS. 5-6 could be interchanged as appropriate to the requirements of a specific application in accordance with embodiments of the invention. Further, although specific valve setting values are discussed above with respect to FIGS. 5-6, various valve setting values as appropriate as appropriate to the requirements of a specific application can be utilized in accordance with embodiments of the invention. Lowering truck beds by activating manual override during power loss in accordance with embodiments of the invention are discussed further below.

Lowering Truck Beds by Activating Manual Override

Figure 7:
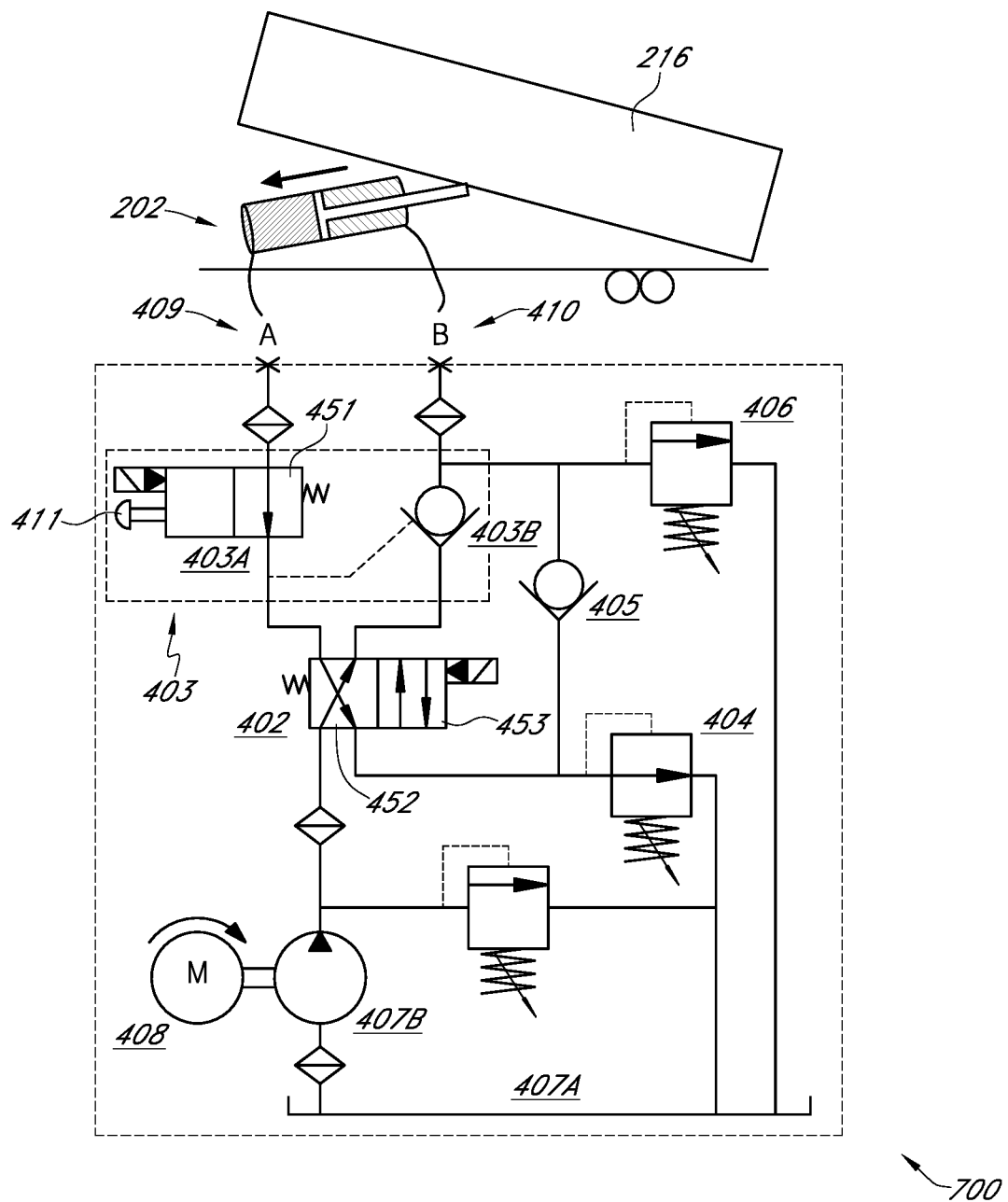
FIG. 7 is a schematic diagram illustrating a powerless hydraulic power unit with manual override control activated to lower a truck bed in accordance with an embodiment of the invention.

A power unit with manual override control may be configured to lower a raised truck bed when the power unit has malfunctioned. For example, a power unit, without power, may be configured to lower a truck bed without overflowing the hydraulic fluid. A schematic diagram illustrating a hydraulic power unit with manual override control when the hydraulic cylinder is lowering a truck bed without power in accordance with an embodiment of the invention is illustrated in FIG. 7. The schematic diagram 700 of the power unit is shown connected to a hydraulic cylinder 202 with a lowering truck bed 216. In many embodiments, the motor 408 may be off since the power unit is without power. In such embodiments, an operator may activate the manual override function using the manual override input device 411 of the manual override control unit 403. In some embodiments, the manual override input device 411 may be, for example, a knob that may be turned or a button that may be pushed, turned or pulled.

In further reference to FIG. 7, since this is a double acting cylinder, there may be hydraulic fluid in the first chamber that may be recirculated back to the second chamber and once the second chamber has filled up, then the remaining hydraulic fluid may return back to the tank 407A. In many embodiments, the hydraulic fluid in the first chamber may be forced out of the bottom port of the hydraulic cylinder through a first hose connecting to the A port 409 of the power unit due to a combination of gravity, mechanical advantage, and the weight of the truck bed 216 pushing on the piston rod. In such embodiments, the second solenoid valve 403A may be in a second position (i.e., loading a control single-directional connector 451) that allows hydraulic fluid to flow through the second solenoid valve 403A to the first solenoid valve 402. In many embodiments, the second solenoid valve 403A may switch from its first position to its second position in response to an operator activating the manual override using the override input device 411. Further, the first solenoid valve 402 may be in a first position 452 that redirects the hydraulic fluid through the first solenoid valve 402 to the first check valve 405. In many embodiments, the fluid may be routed out of the B port 410 since other paths are the closed end of the second check valve 403B and the third relief valve 406. In various embodiments, the second chamber created low pressure (vacuum) which allows for the hydraulic fluid is thus routed out of the B port 410 through a second hose and enters the second chamber via the top port of the hydraulic cylinder. Once the second chamber is filled, the internal pressure within the second chamber may build to overcome a predetermined pressure on the second relief valve 404 and thus allowing any remainder of the hydraulic fluid from the first chamber to return to the tank 407B without overflowing the system.

Although specific hydraulic power units with manual override controls for lowering truck beds by activating manual override during power loss are discussed above with respect to FIG. 7, any of a variety of hydraulic power units with manual override controls for various hydraulic systems as appropriate to the requirements of a specific application can be utilized in accordance with embodiments of the invention. Further, although various components (e.g., tank, pump, valves) are discussed above with respect to FIG. 7, any of a variety of components as appropriate to the requirements of a specific application can be utilized in accordance with embodiments of the invention. For example, various components discussed above with respect to FIG. 7 could be interchanged as appropriate to the requirements of a specific application in accordance with embodiments of the invention. Further, although specific valve setting values are discussed above with respect to FIG. 7, various valve setting values as appropriate as appropriate to the requirements of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A power unit with manual override control for a hydraulic device having an initial state, the power unit comprising:
    a tank for storing hydraulic fluid that moves between a first chamber and a second chamber of the hydraulic device;
    a pump configured to connect to a motor having a powered on and a powered off configuration, wherein the motor provides power to the pump to route the hydraulic fluid in and out of the tank in moving the hydraulic fluid between the first chamber and second chamber of the hydraulic device; and
    a manual override control unit comprising a check valve comprising an open end and a closed end, and a solenoid valve comprising a control single-directional connector, wherein activation of the manual override control unit returns the hydraulic device to the initial state.

2. The power unit of claim 1 further comprising an A port, wherein the A port is configured to connect to the first chamber of the hydraulic device to allow the hydraulic fluid to enter and exit the first chamber and a B port, wherein the B port is configured to connect to the second chamber of the hydraulic device to allow the hydraulic fluid to enter and exit the second chamber.

3. The power unit of claim 1, wherein the the solenoid valve further comprises a control check valve having an open end and a closed end.

4. The power unit of claim 3, wherein the closed end of the control check valve is connected to the first chamber prior to the activation of the manual override control unit.

5. The power unit of claim 1, wherein the activation of the manual override control unit causes the control single-directional connector to connect to the first chamber of the hydraulic device.

6. The power unit of claim 5, wherein the connection of the control single-directional connector to the first chamber allows hydraulic fluid to exit the first chamber.

7. The power unit of claim 6, wherein the hydraulic fluid exits the first chamber with assistance from gravity.

8. The power unit of claim 6, wherein the hydraulic fluid exiting the first chamber is routed to the tank.

9. The power unit of claim 6, wherein the hydraulic fluid exiting the first chamber creates a low pressure vacuum in the second chamber.

10. The power unit of claim 9, wherein the low pressure vacuum in the second chamber causes the hydraulic fluid to enter the second chamber.

11. The power unit of claim 10, wherein an internal pressure within the second chamber increases to apply pressure for the hydraulic fluid to route to the tank.

12. The power unit of claim 6 further comprising at least one relief valve, wherein the at least one relief valve is configured to open when pressure across the at least one relief valve reaches a relief valve setting of the at least one relief valve.

13. The power unit of claim 12, wherein the hydraulic fluid exiting the first chamber creates pressure to overcome the relief valve setting of the at least one relief valve allowing hydraulic fluid to route to the tank.

14. The power unit of claim 1, wherein the closed end of the check valve is configured to connect to the second chamber of the hydraulic device and wherein the check valve is configured to allow hydraulic fluid to flow in one direction and block flow in an opposite direction so long as pressure across the check valve is below a check valve setting.

15. The power unit of claim 14 further comprising a further solenoid valve connected to the pump having a first position and a second position.

16. The power unit of claim 15, wherein the further solenoid valve connected to the pump connects the pump to the open end of the check valve.

17. The power unit of claim 1, wherein the manual override control unit further comprises an override input device.

18. The power unit of claim 17, wherein the override input device is activated via a direct connection.

19. The power unit of claim 17, wherein the override input device is activated via a wireless connection.

\* \* \* \* \*